United States Patent [19]
Dege

[11] Patent Number: 5,816,109
[45] Date of Patent: Oct. 6, 1998

[54] SYSTEM AND DEVICE FOR CONNECTING AND ADJUSTING TWO CABLES

[75] Inventor: Thomas Dege, Rochester Hills, Mich.

[73] Assignee: Chrysler Corporation, Auburn Hills, Mich.

[21] Appl. No.: 763,639

[22] Filed: Dec. 11, 1996

[51] Int. Cl.[6] .................................................. F16C 1/22
[52] U.S. Cl. ...................... 74/502.4; 74/502.6; 24/116 A; 24/910; 188/2 D
[58] Field of Search .......................... 188/2 D, 196 BA, 188/196 V, 265; 74/500.5, 501.5 R, 502.4, 502.6; 24/68 CT, 68 F, 116 A, 128, 909, 910; 403/302, 353

[56] References Cited

U.S. PATENT DOCUMENTS

| | | | |
|---|---|---|---|
| 567,367 | 9/1896 | Truelsen | 24/910 |
| 2,451,933 | 10/1948 | England | 24/910 |
| 3,806,992 | 4/1974 | Reimer | 24/909 |
| 3,829,825 | 8/1974 | Hawkins | 439/798 |
| 4,817,452 | 4/1989 | Burkey | 188/2 D |
| 5,203,068 | 4/1993 | Siring | 74/502.6 |
| 5,225,866 | 10/1993 | Campolo | 24/910 |
| 5,263,449 | 11/1993 | Swartzendruber | 74/502.6 |

FOREIGN PATENT DOCUMENTS 0110355  6/1983  Japan ..................................... 188/2 D

*Primary Examiner*—Chris Schwartz
*Attorney, Agent, or Firm*—Jennifer M. Stec

[57] ABSTRACT

A system and device for connecting and adjusting at least two cables is disclosed. The device includes a first elongate cavity with an upper portion having a cable receiving aperture disposed therein, a lower portion having a bracket disposed therein, and a middle portion integrally formed with, and connecting, the upper and lower portions of the first elongate cavity. A second elongate cavity is also included in the device that has an upper portion with a cable receiving aperture disposed therein. A lower portion is also included that has a rotation aperture disposed therein. The rotation aperture provides for rotation of the device when a tool is inserted therein and when a first cable is inserted into the cable receiving aperture of the first elongate cavity and a second cable is inserted into the cable receiving aperture of the second elongate cavity, thereby creating an over-center lock by moment of force that maintains tension on the first and second cables. The second elongate cavity also has a middle portion integrally formed with, and connecting, the upper and lower portions of the second elongate cavity. The device also includes a joining member integrally formed with, and connecting, the first and second elongate cavities.

11 Claims, 2 Drawing Sheets

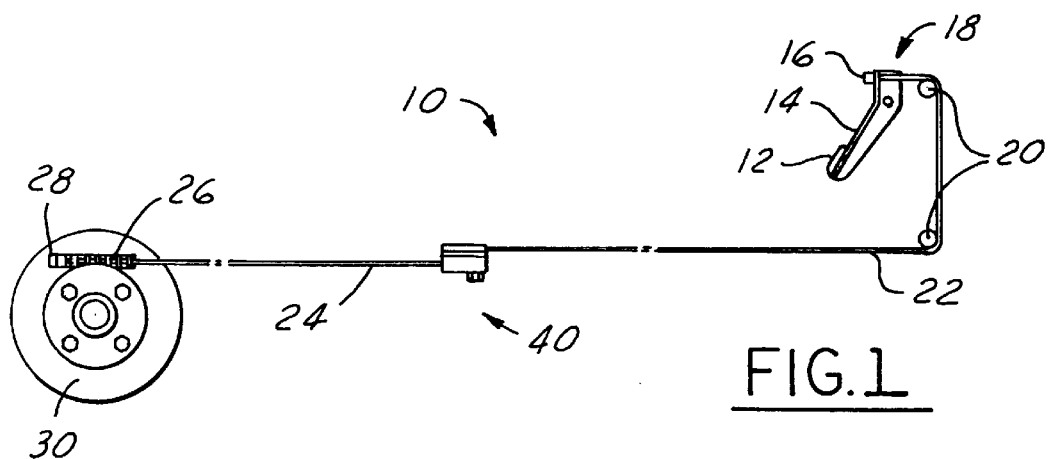
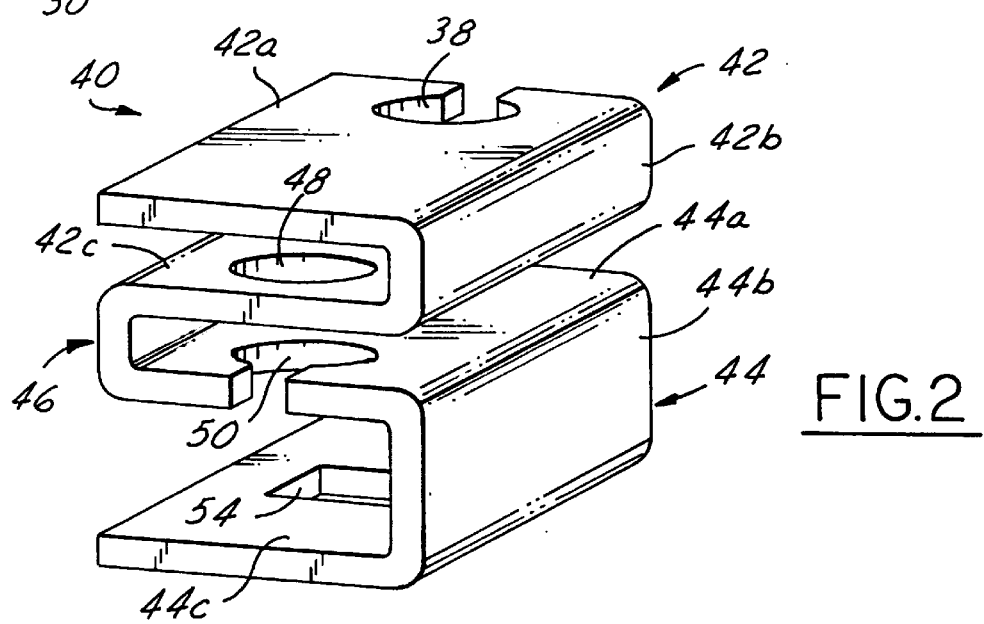
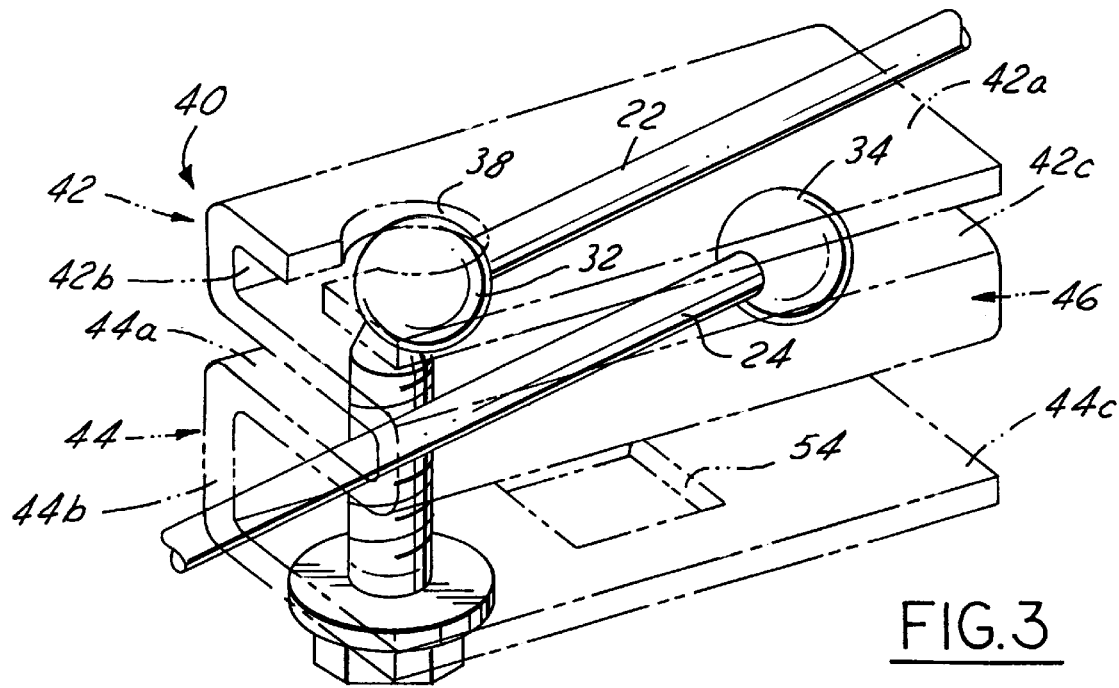

SYSTEM AND DEVICE FOR CONNECTING AND ADJUSTING TWO CABLES

BACKGROUND

1. Field of the Invention

In general, the present invention relates to a device for securing two cables together, and more particularly, to a system and device for connecting at least two cables together and taking up excess slack in each of the cables while simultaneously providing an over-center locking function.

2. Description of the Related Art

Through the years, many industries have saw the need to connect two cables of a mechanism together, and have employed various devices to accomplish this function. In particular, one of these industries is the automotive industry, which typically manufactures vehicles having numerous detached cables that must be connected together. Current cable connectors used in vehicles are bulky and take up precious space within the engine compartment or under carriage of the vehicle. Although these devices allow for the connection of two separate cables that span long distances, they also allow for slack to exist in the two connected cables. Current cable connection devices also fail to provide an over-center locking mechanism to take up slack between the two connected cables and hold them taunt. Moreover, current cable connector devices fail to take up slack in each of the cables that is greater than the length of the cable connector device, thereby making the devices function poorly given vehicle space constraints.

For example, U.S. Pat. Nos. 4,323,273 to Sword; 3,100,323 to Baker; and 1,584,830 to Bardon all disclose cable connecting devices primarily used in the logging industry. These devices are bulky, do not have an over-center locking mechanism, and fail to take up slack in the two connected cables. Moreover, means are not provided for stacking the devices so that a plurality of cables can be attached thereto.

SUMMARY OF THE INVENTION

The present invention eliminates the disadvantages in the prior art by providing a system and device for connecting and adjusting at least two cables. The device includes a first elongate cavity with an upper portion having a cable receiving aperture disposed therein, a lower portion having two brackets disposed therein, and a middle portion integrally formed with, and connecting, the upper and lower portions of the first elongate cavity.

A second elongate cavity is also included in the device that has an upper portion with a cable receiving aperture disposed therein. A lower portion is also included that has a rotation aperture disposed therein. The rotation aperture provides for rotation of the device when a first cable is inserted into the cable receiving aperture of the first elongate cavity and the second cable is inserted into the cable receiving aperture of the second elongate cavity, thereby creating an over-center lock by moment of force that maintains tension on the first and a second cable connected thereto.

The second elongate cavity also has a middle portion integrally formed with, and connecting, the upper and lower portions of the second elongate cavity. The device also includes a joining member integrally formed with, and connecting, the first and second elongate cavities. Slack, greater than the length of the device, may be taken up in each of the first and second cables by rotating the device 180 degrees or more.

Other objects, features and advantages of the present invention will become apparent by reference to the following detailed description when considered in conjunction with the accompanying drawings.

BRIEF DESCRIPTION OF THE DRAWINGS

In the drawings below, reference characters refer to like parts throughout the views, and wherein:

FIG. 1 is a side elevational view of a system for connecting and adjusting at least two cables of the present invention;

FIG. 2 is a perspective view of a device for connecting and adjusting at least two cables of the present invention;

FIG. 3 is a perspective view of the device of the present invention showing two cables disposed therein with the device rotated such that an over-center lock is created between the two cables;

DESCRIPTION OF THE PREFERRED EMBODIMENT(S)

Figure 4:
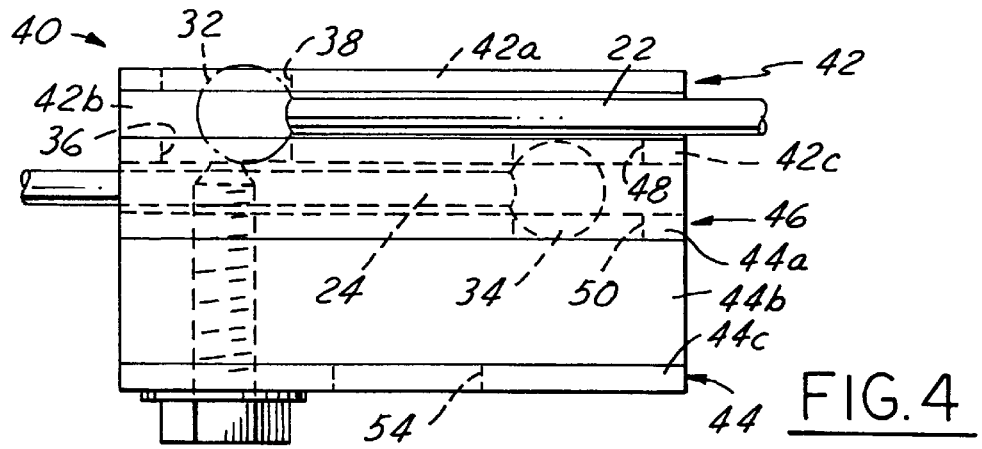
FIG. 4 is a side elevational view of the device of the present invention.
Figure 5:
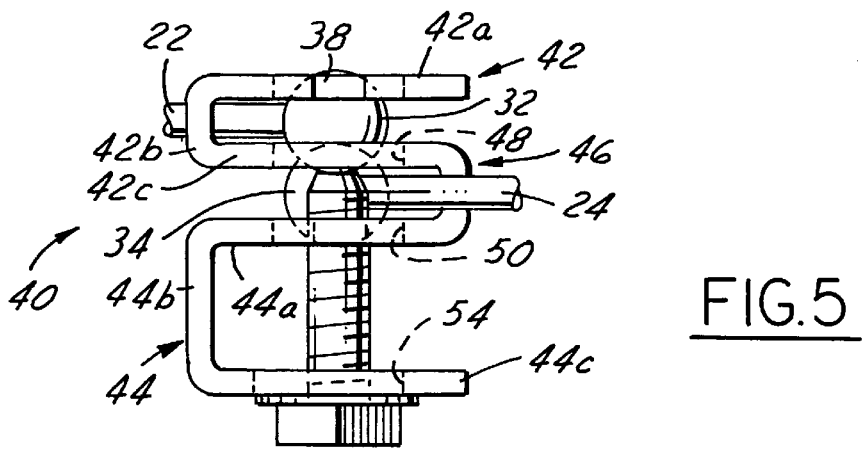
FIG. 5 is a side elevational view of the device of the present invention taken along one end of the device.

Commencing with FIG. 1, a system 10 for connecting and adjusting a first cable or front parking brake cable 22 to a second cable or rear parking brake cable 24 is shown. The system 10 includes a parking brake 18 that has a parking brake pedal 12 mounted on a parking brake lever 14. The lever 14 is connected to the first parking brake cable 22 by cable retaining cap 16 that is attached to one end of the parking brake cable 22, which extends around two parking brake mounts 20 and further along the under carriage of a vehicle (not shown). The end of the front parking brake cable 22, opposite the parking brake 18, is attached to a cable connector and adjuster device 40. The system 10 further includes a rear parking brake cable 24 that is attached to the device 40, extends along the vehicle, and terminates at a cable retaining cap 28. Disposed around the rear parking brake cable 24 is a spring sleeve 26. The rear parking brake cable 24 is attached by a retention device (not shown) to a wheel brake 30 for locking the brakes of the vehicle when the parking brake 18 is engaged.

Referring now to FIG. 2, the cable connector and adjuster device 40 is shown, which has a given length and is used in the present invention for connecting and adjusting the front parking brake cable 22 to the rear parking brake cable 24. As shown in FIGS. 3–7, the cables 22 and 24 have ball cap ends 32 and 34, respectively, (it is understood that other cap ends could also be used in the present invention) for inserting into the device 50. The device 40 includes a first elongate cavity 42, which in the preferred embodiment is U-shaped. The first U-shaped elongate cavity 42 includes an upper portion 42a that has a cable receiving aperture 38 disposed therein. The first U-shaped elongate cavity 42 further includes a lower portion 42c that has a first bracket 48 disposed therein. And, as shown in FIG. 4, a second bracket 36 disposed therein. Further included in elongate cavity 42 is a middle portion 42b that is integrally formed with, and connects, the upper portion 42a and lower portion 42c of the first U-shaped elongate cavity 42.

The device 40 further includes a second elongate cavity 44 that, in the preferred embodiment, is U-shaped analogous to the first elongate cavity 42. The second U-shaped elongate cavity 44 includes an upper portion 44a that has a cable receiving aperture 50 disposed therein.

Figure 7:
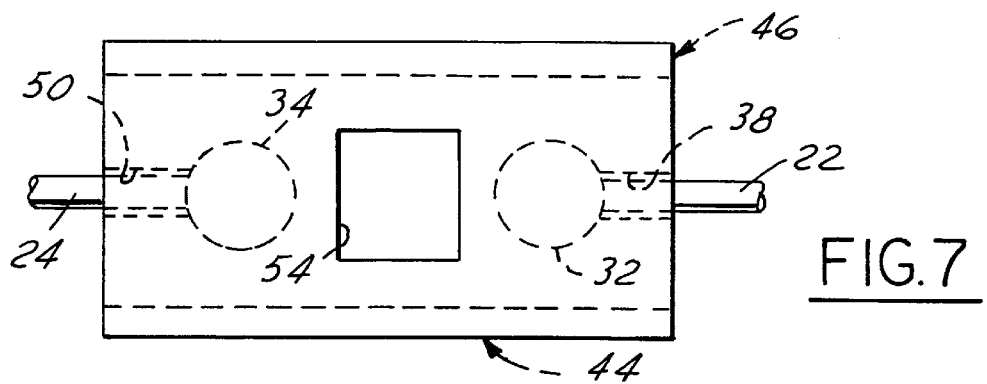
FIG. 7 is a plan view of the device of the present invention showing the cables at their device insertion points prior to the device being rotated.

The second U-shaped elongate cavity 44 further includes a lower portion 44c that has a rotation aperture 54 disposed therein. When a proper tool fitting the aperture 54 is inserted therein, the rotation aperture 54 provides for rotation of the device 40 180 degrees or more when the front parking brake cable 22 and the rear parking brake cable 24 are in their initial positions as shown in FIG. 7. The cables 22 and 24 are in their initial positions when inserted into the cable receiving aperture 38 of the first U-shaped elongate cavity 42 and when the rear parking brake cable 24 is inserted into the cable receiving aperture 50 of the second U-shaped elongate cavity 44. The second U-shaped elongate cavity 44 further includes a middle portion 44b that is formed with, and connects, the upper portion 44a and lower portion 44c of the second U-shaped member 44. The device 40 further includes a joining member 46 that is integrally formed with, and connects, the first U-shaped elongate cavity 42 and the second U-shaped elongate cavity 44. It is appreciated that the device 40 has a cascading function such that each addition of another U-shaped elongate cavity and joining member will allow for the insertion of another cable in the device 40.

Figure 6:
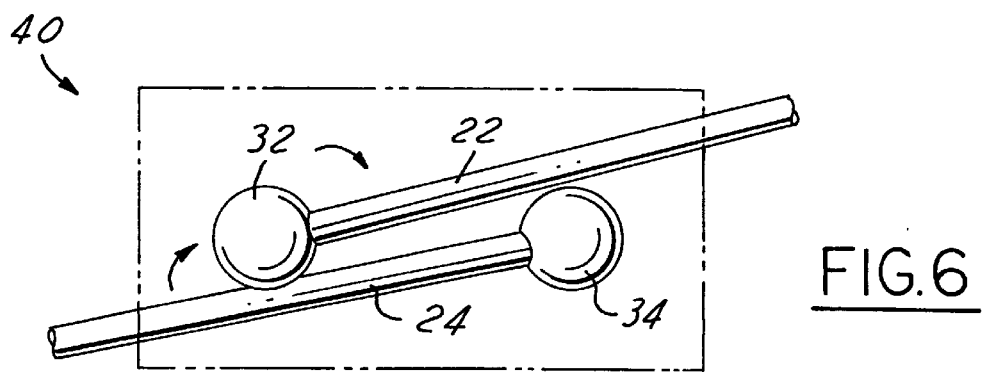
FIG. 6 is a top view of the device of the present invention showing clockwise moments of force exerted on the cables disposed therein, which thereby create the over-center lock.

As shown in FIGS. 3–6, when rotation of the device 40 occurs an over-center lock is created by a moment of force that maintains tension on the front and rear parking brake cables 22 and 24, respectively. As best shown in FIG. 6, the moment of force created is in the clockwise direction when the device 40 is viewed in plan, thereby forcing the front parking brake cable 22 toward the rear parking brake cable 24, and in turn, forcing the rear parking brake cable 24 toward the front parking brake cable 22.

When the device 40 is rotated, slack is adjusted in each of the front and rear parking brake cables 22 and 24, respectively. For interior space reasons, one advantage of the present invention is that when the device 40 is rotated 180 degrees or more the slack that is adjusted in each of the front and rear parking brake cables 22 and 24, respectively, is greater than the length of the device 40.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A device, having a given length, for connecting and adjusting a first cable to a second cable, the device comprising:
    a first elongate cavity including an upper portion having a cable receiving aperture disposed therein, a lower portion having a bracket disposed therein, and a middle portion integrally formed with, and connecting, the upper and lower portions of the first elongate cavity;
    a second elongate cavity including an upper portion having a cable receiving aperture disposed therein, a lower portion, and a middle portion integrally formed with, and connecting, the upper and lower portions of the second elongate cavity;
    a joining member integrally formed with, and connecting, the first and second elongate cavities; and
    wherein rotation of the device 180 degrees creates an over-center lock by moment of force that maintaining tension on the first and second cables.

2. The device of claim 1 wherein the device includes means for cascading the first and second elongate cavities and the joining member.

3. The device of claim 1 further comprising a rotation aperture disposed in the lower portion of the second elongate cavity, the rotation aperture providing for rotation of the device when the first cable is inserted into the cable receiving aperture of the first elongate cavity and the second cable is inserted into the cable receiving aperture of the second elongate cavity.

4. The device of claim 1 wherein slack is adjusted in each of the first and second cables that is greater than the length of the device when the device is rotated.

5. A device, having a given length, for connecting and adjusting a front parking brake cable to a rear parking brake cable, the device comprising:
    a first U-shaped elongate cavity including an upper portion having a cable receiving aperture disposed therein, a lower portion having two brackets disposed therein, and a middle portion integrally formed with, and connecting, the upper and lower portions of the first U-shaped elongate cavity;
    a second U-shaped elongate cavity including an upper portion having a cable receiving aperture disposed therein, a lower portion having a rotation aperture disposed therein and providing for rotation of the device 180 degrees when the front parking brake cable is inserted into the cable receiving aperture of the first U-shaped elongate cavity and the rear parking brake cable is inserted into the cable receiving aperture of the second U-shaped elongate cavity, and a middle portion integrally formed with, and connecting, the upper and lower portions of the second U-shaped elongate cavity;
    a joining member integrally formed with, and connecting, the first and second U-shaped elongate cavities; and
    wherein rotation of the device 180 degrees creates an over-center lock by moment of force that maintaining tension on the front and rear parking brake cables.

6. The device of claim 5 wherein slack is adjusted in each of the first and second cables when the device is rotated.

7. The device of claim 5 wherein slack is adjusted in each of the front and rear parking brake cables that is greater than the length of the device when the device is rotated.

8. A system for connecting and adjusting at least two cables, the system comprising:
    a front parking brake cable;
    a brake pedal attached to the front parking brake cable;
    a rear parking brake cable;
    a device having a given length, the device comprising:
        a first U-shaped elongate cavity including an upper portion having a cable receiving aperture disposed therein, a lower portion having two brackets disposed therein, and a middle portion integrally formed with, and connecting, the upper and lower portions of the first U-shaped elongate cavity, the front parking brake cable disposed in the cable receiving aperture of the first U-shaped elongate cavity opposite the parking brake;

a second U-shaped elongate cavity including an upper portion having a cable receiving aperture disposed therein, a lower portion having a rotation aperture disposed therein, and a middle portion integrally formed with, and connecting, the upper and lower portions of the second U-shaped elongate cavity, the rear parking brake cable disposed in the cable receiving aperture of the second U-shaped elongate cavity; and a joining member integrally formed with, and connecting, the first and second U-shaped elongate cavities;

a wheel brake attached to the rear brake cable opposite the device; and wherein the rotation aperture of the second U-shaped elongate cavity provides for rotation of the device over 180 degrees thereby creating an over-center lock by moment of force that maintains tension on the front and rear parking brake cables.

9. The system of claim 8 wherein slack is adjusted in each of the first and second cables when the device is rotated.

10. The system of claim 8 wherein slack is adjusted in each of the front and rear parking brake cables that is greater than the length of the device when the device is rotated.

11. The system of claim 8 wherein the device includes means for cascading the first and second elongate cavities and the joining member.

* * * * *